United States Patent [19]

Falk

[11] Patent Number: 4,930,575

[45] Date of Patent: Jun. 5, 1990

[54] METHOD OF PROTECTING A PERMEABLE FORMATION

[75] Inventor: David O. Falk, Denver, Colo.

[73] Assignee: Marathon Oil Company, Findlay, Ohio

[21] Appl. No.: 331,934

[22] Filed: Mar. 31, 1989

[51] Int. Cl.$^5$ .................... E21B 7/00; E21B 33/138; E21B 33/14

[52] U.S. Cl. .................... 166/295; 166/285; 166/297; 166/300; 175/72

[58] Field of Search ........ 166/281, 285, 287, 292–295, 166/297, 298, 300; 175/72

[56] References Cited

U.S. PATENT DOCUMENTS

| | | | |
|---|---|---|---|
| 2,223,804 | 12/1940 | Kennedy | 166/281 |
| 2,236,836 | 4/1941 | Prutton | 166/297 X |
| 2,286,835 | 6/1942 | Robinson et al. | 166/294 |
| 2,483,936 | 10/1949 | Roberts . | |
| 3,024,191 | 3/1962 | Jones . | |
| 3,141,513 | 7/1964 | Davis | 175/72 X |
| 3,167,510 | 1/1965 | Alter . | |
| 3,208,524 | 9/1965 | Horner et al. | 175/72 X |
| 3,223,162 | 12/1965 | Burge | 166/295 X |
| 3,302,717 | 2/1967 | West et al. . | |
| 3,310,112 | 3/1967 | Nielsen et al. . | |
| 3,405,062 | 10/1968 | Kuhn . | |
| 3,442,803 | 5/1969 | Hoover et al. . | |
| 3,615,794 | 10/1971 | Nimerick | 106/206 |
| 3,740,360 | 6/1973 | Nimerick | 175/72 |
| 3,938,594 | 2/1976 | Rhudy et al. | 166/308 |
| 4,191,254 | 3/1980 | Baughman et al. | 175/72 X |
| 4,210,206 | 7/1980 | Ely et al. | 166/294 |
| 4,378,049 | 3/1983 | Hsu et al. | 166/295 |
| 4,499,232 | 2/1985 | Engelhardt et al. | 524/548 |
| 4,553,601 | 11/1985 | Almond et al. | 166/308 |
| 4,565,640 | 1/1986 | Parks | 252/8.551 |
| 4,589,490 | 5/1986 | Darr et al. | 166/295 X |
| 4,601,339 | 7/1986 | Jennings, Jr. | 166/281 |
| 4,604,218 | 8/1986 | Dawson | 252/8.553 |
| 4,605,061 | 8/1986 | Jennings, Jr. | 166/63 |
| 4,621,692 | 11/1986 | Mondshine | 166/281 |
| 4,624,795 | 11/1986 | Dawson et al. | 252/8.553 |
| 4,643,255 | 2/1987 | Sandiford et al. | 175/72 X |
| 4,724,906 | 2/1988 | Sydansk | 166/300 |
| 4,819,727 | 4/1989 | Jennings, Jr. | 166/292 |
| 4,838,352 | 6/1989 | Oberste-Padtberg et al. | 166/295 |

Primary Examiner—George A. Suchfield
Attorney, Agent, or Firm—Jack L. Hummel; Jack E. Ebel

[57] ABSTRACT

A method of protecting a permeable formation penetrated by a well bore against damage by subsequent treatment operations. In protecting the formation against damage by cement used in installing a casing, a well bore is drilled through the formation and liquid composition capable of gelling is introduced into the area of the formation. After the gel is formed it is drilled out, leaving a sufficient amount still plugging the voids in the formation wall. Subsequently, after installing the casing, the gel reverts to liquid form, leaving the permeable formation in condition for production of the well. Preferably, the gel contains a breaker to cause the gel to revert to liquid form after a predetermined period of time.

19 Claims, 2 Drawing Sheets

METHOD OF PROTECTING A PERMEABLE FORMATION

FIELD OF THE INVENTION

This invention relates to a method of protecting a permeable formation against damage or interference from a treatment operation. More particularly, it relates to such a method which is particularly applicable during the drilling and completion of a well bore.

BACKGROUND OF THE INVENTION

In the drilling of a well bore for the production of oil from subterranean oil-bearing formations, zones of high permeability which are useful in subsequent production operations are often penetrated. Because completion work involving the cementing of a casing to the well bore can result in the cement entering the permeable formation and acting as a barrier to optimum oil flow, it is desirable to protect the formation against the entry of the cement.

Although it is known to use cement or gels to protect or seal certain formations during treatment of a well, as in fracturing operations or testing other formations, the same techniques are not readily adaptable for sealing off permeable zones during the drilling of a well. A method of protecting a permeable formation which is quick, reliable and effective, and wherein the sealing means can be readily removed at a later time would be highly desirable.

SUMMARY OF THE INVENTION

This invention involves protecting a permeable formation penetrated by a well bore by providing support means in the well bore adjacent the lower boundary of the permeable formation and filling the bore between the support means and the uppermost point of the permeable formation to be protected with a liquid composition capable of gelling under the conditions encountered in the well bore. The liquid composition is allowed to gel, after which it is drilled through so as to open the bore in the permeable formation. The gel remaining after the drilling operation, that is, the gel which had entered the formation or which was adhered to the side wall of the bore and not removed by the subsequent drilling operation, plugs the permeable formation in the well bore. As a result, a subsequent treatment operation such as cementing a casing to the well bore can be carried out without affecting the permeable formation, which remains sealed by the remaining gel. Following the treatment operation the gel is caused to revert to liquid form to allow the permeable formation to be produced. The gel preferably contains a breaker to cause the gel to revert to a liquid after a predetermined length of time.

In one form of the invention the support means for the gel is the temporary or undrilled bottom of the well bore. After the gel has been removed from the portion of the well bore in the permeable formation, the drilling of the well bore down to the planned depth can be continued. The same sequence may be followed where more than one permeable formation is encountered during the drilling operation, each lower permeable formation encountered being sequentially handled in the same manner.

Permeable zones encountered during the drilling of a well bore can thus be protected in a simple, economical and effective manner to ensure their optimum production of oil at a later time.

DESCRIPTION OF THE PREFERRED EMBODIMENT

Figure 1:
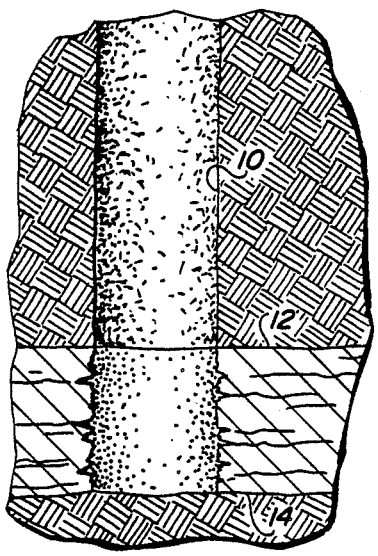
FIG. 1 is a partial schematic view of a partially drilled well bore extending into a permeable formation.

Referring to FIG. 1, a well bore 10 is shown as having penetrated a permeable formation 12 disposed at a depth intermediate the intended depth of the well bore. If the well bore is continued to be drilled and the casing installed, the cementing of the casing in the permeable zone will often plug the formation, preventing optimum oil production from the formation. In accordance with the invention the drilling operation is halted when it reaches the bottom 14 of the permeable zone 12, although it may be continued somewhat beyond if desired in order to ensure that the bore has been drilled to the full depth of the permeable formation.

Figure 2:
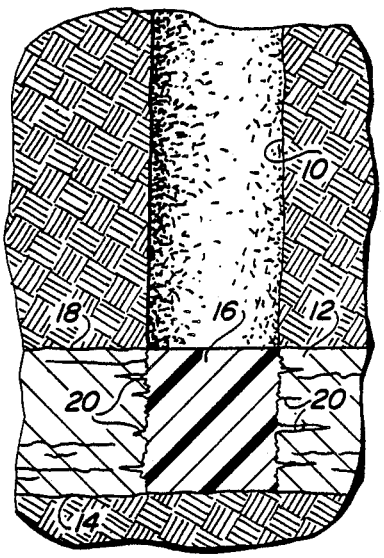
FIG. 2 is a view similar to that of FIG. 1, but showing the bore after the liquid composition has been introduced and has gelled.

As shown in FIG. 2, the next step in the method is to fill the bore 10 with a liquid composition 16 to a level reaching the top 18 of the permeable zone, the liquid composition being capable of gelling under the conditions encountered in the bore. As in the case of drilling to a point slightly beyond the bottom of the formation, the bore may similarly be filled to a level somewhat higher than the apparent top of the permeable zone in order to ensure that the gel contacts the full thickness of the formation. As illustrated at 20, some of the liquid composition will enter the fissures and pores of the permeable formation intersecting the well bore and will extend into them for a short distance, typically in the order of 15–60 cm. The liquid composition is then allowed to gel in place so that the well bore at this stage of the drilling operation is filled with a mature gel plug in the permeable zone 12.

Any suitable gel composition which can be pumped as a liquid and which subsequently crosslinks in place to form a mature gel which is nonflowable and has sufficient strength to withstand the pressures exerted on it can be used. In addition, the gel must be capable of breaking down and reverting to liquid form to permit subsequent production of the permeable formation.

Gels of particular interest are gels comprised of a carboxylate-containing polymer crosslinked with a crosslinking agent comprising a chromic carboxylate complex. The carboxylate-containing polymer may be any crosslinkable, high molecular weight, water soluble, synthetic polymer or biopolymer containing one or more carboxylate species. The average molecular weight of the carboxylate-containing polymer is in the range of about 10,000 to about 50,000,000, with the preferred range being about 100,000 to about 20,000,000.

The biopolymers which can be used include polysaccharides and modified polysaccharides. Exemplary biopolymers are guar gum and carboxymethylcellulose. Examplary synthetic polymers include acrylamide polymers, such as polyacrylamide, partially hydrolyzed polyacrylamide and terpolymers containing acrylamide, acrylate and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any of the well known conventional methods in the art. The preferred carboxylate-containing polymer is polyacrylamide or partially hydrolyzed polyacrylamide.

With respect to the chromic carboxylate complex crosslinking agent, the term "complex" means an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex useful as a crosslinking agent includes at least one or more electropositive chromium III species and one or more electronegative carboxylate species. Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompased by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propianate, lactate, lower substituted derivatives thereof and mixtures thereof, all of which are water soluble. The optional organic ions include sodium, sulfate, nitrate and chloride ions.

The complexes described and their method of preparation are well known in the art. The preferred chromic carboxylate complex for use in this invention is chromic acetate complex.

A preferred gel suitable for use in the invention is one of polyacrylamide or partially hydrolyzed polyacrylamide crosslinked with chromic triacetate. As is well known in the art, these gels can be readily formulated as a low viscosity fluid having a broad range of strengths and gel onset times. For example, 2% polyacrylamide (PA) with chromic triacetate (CrAc) in a ratio of 20 PA:CrAc results in a suitable gel which is stable at 185° F. for a period of more than thirty days. By adding a breaker to the gel composition the gel will break down within a predetermined period of time, reverting to a nonviscous fluid. For example, ammonium persulfate and sodium nitrite, when incorporated in the gel composition in amounts from 1000 to 8000 ppm, broke gels between 20 and 30 days at 75° F. It will be understood that other formulations can be designed to break the gel in much less time, as low as a day, if desired. Thus the particular gel-breaker composition utilized can be selected to suit the time schedule of the project.

As is known in the art, a number of different types of breakers may be used in connection with a polyacrylamide-chromic triacetate gel system. In addition to the oxidizing agents mentioned, a number of other oxidizing agents such as sodium persulfate, sodium chlorate, sodium perchlorate and sodium perborate may be used. Other types of breakers which can be employed with the gel system include strong chemical breakers, such as hydrogen peroxide, sodium chlorite, perchloric acid and sodium peroxide; chelating agents, such as oxalic acid, citric acid, sodium tartrate and sodium citrate; and organic chemicals such as methylacetoacetate, ethylacetate, ethylacetoacetate and dichloroacetic acid.

Those skilled in the art of gelation will recognize that other gel systems and associated breakers in addition to those mentioned may be utilized to fill the bore 16 to the desired level and subsequently revert to liquid form.

In addition to the various specific breakers which can be employed, the physical form of the breaker can be designed to assist in controlling the time of breaking the gel. Thus in order to lengthen the time before the gel reverts to liquid form, breakers may be encapsulated so that when dispersed in a polymer-crosslinked solution they will be released into the solution only after an extended period of time. In another modification, water soluble breakers can be emulsified in oil to provide for slow release into the gel systems. Similarly, oil soluble breakers can be emulsified in water to obtain the desired slow release.

Figure 3A:
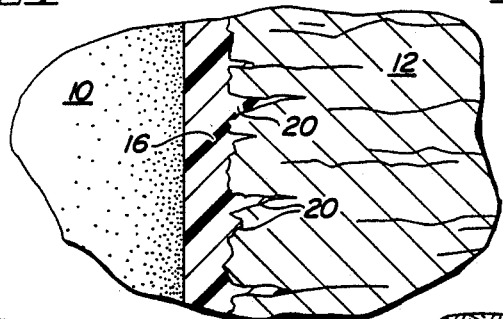
FIG. 3A is an enlarged view of a portion of the well bore and adjoining formation shown in FIG. 3.
Figure 3:
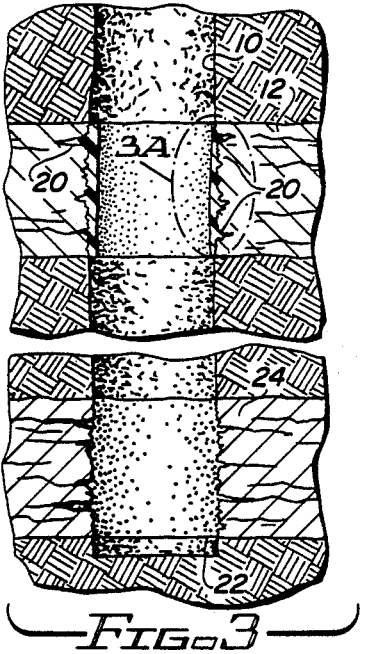
FIG. 3 is a view similar to that of FIG. 1, but showing the well bore after it has been drilled into a second permeable formation at a lower depth.

Referring back to the drawing, the next step in the method is to drill out the crosslinked gel 16 of FIG. 2 and to extend the well bore down below the permeable zone 12 to the planned depth. This has been done in the situation depicted in FIG. 3, where the bore 10 has been extended down to the planned bottom 22 just below another permeable formation or zone 24. The gel remaining after the drilling operation, that is, the gel 20 which had entered the formation 12 or which was adhered to the side wall of the bore and not removed by the subsequent drilling step, plugs the permeable formation in the well bore. In addition to being shown in FIG. 3, the remaining gel is further depicted in the enlarged view of FIG. 3A.

Figure 4:
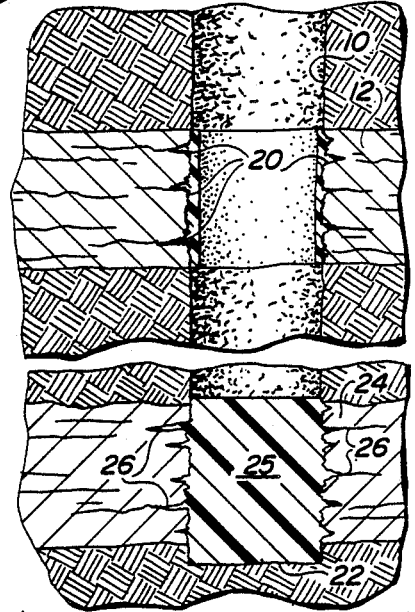
FIG. 4 is a view similar to that of FIG. 3, but showing the bore after a second slug of gel has been introduced.
Figure 5:
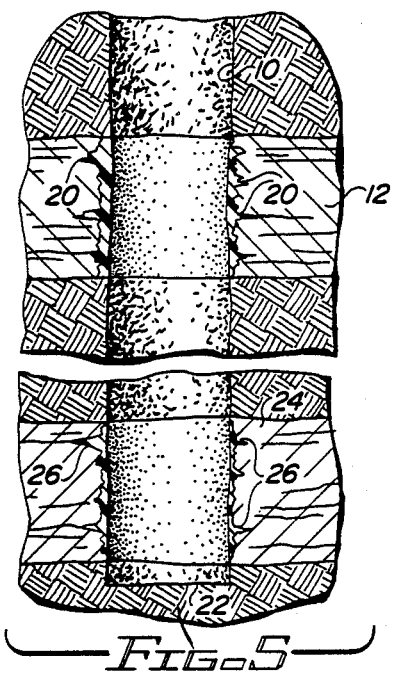
FIG. 5 is a view similar to that of FIG. 4, but showing the bore after the second slug of gel has been removed by further drilling.

As in the case of the first permeable zone 12, it is necessary to protect the formation 24 prior to installing the casing. This is done in the same manner as with the first permeable formation. As shown in FIG. 4, a liquid composition 25 is introduced into the bore 10 and is filled to a level slightly above the top of the formation 24. As before, the liquid composition flows into the fissures and pores of the formation 24 for a short distance as indicated at 26 and is allowed to gel. After the liquid composition gels, it is drilled out and the well bore appears as in FIG. 5, with the bore extending all the way down to the bottom 22 and with the gel still filling the cracks and fissures as indicated by reference numerals 20 and 26.

Figure 6:
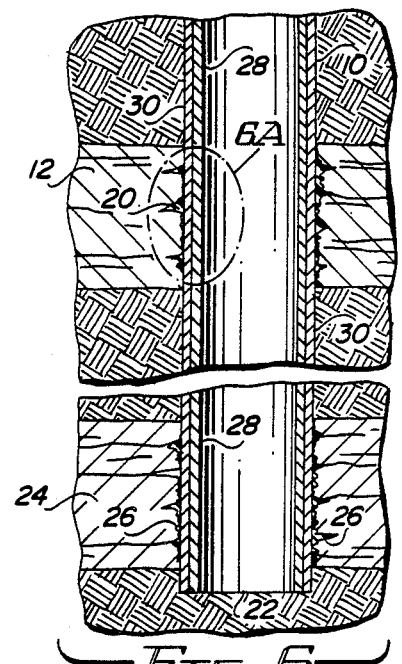
FIG. 6 is a schematic view of the well bore of FIG. 5 after the well casing has been put in place.
Figure 6A:
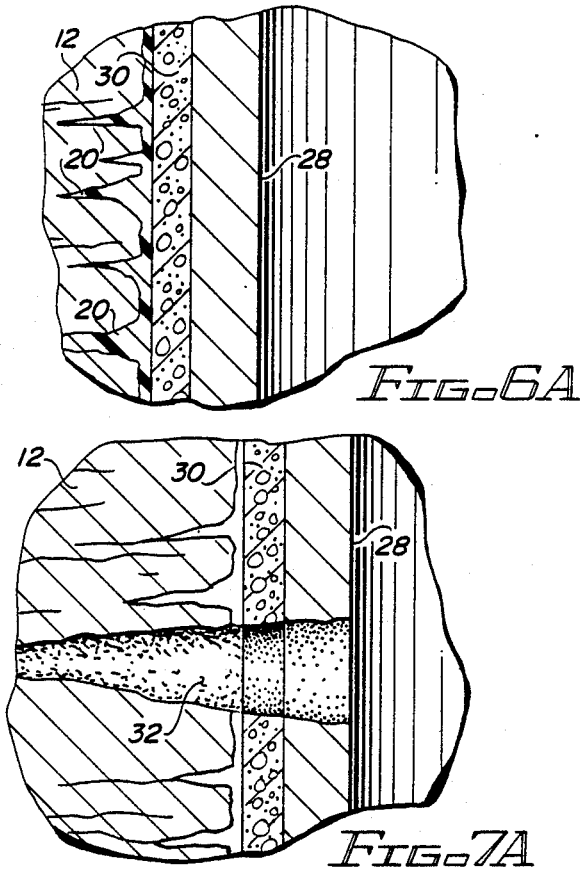
FIG. 6A is an enlarged view of a portion of the well bore and adjoining formation shown in FIG. 6.

Referring to FIG. 6, the casing 28 is installed in the well bore 10 in conventional manner and is cemented to the bore by cement 30. Because the gels 20 and 26 are still in place, as shown more clearly in FIG. 6A, the cement is blocked against entering the formations 12 and 24.

Figure 7:
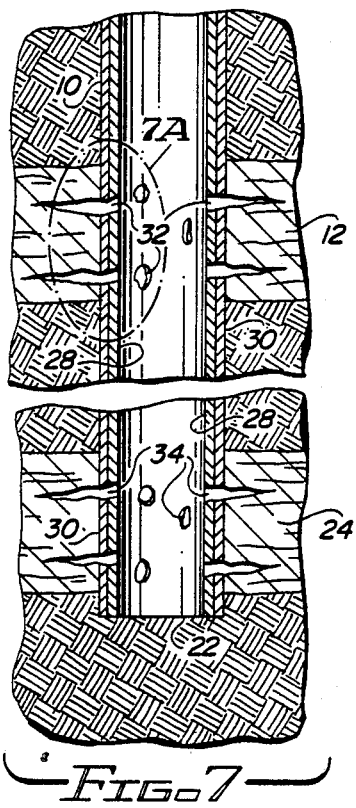
FIG. 7 is a schematic view of the well bore of FIG. 6 after it has been readied for production.
Figure 7A:
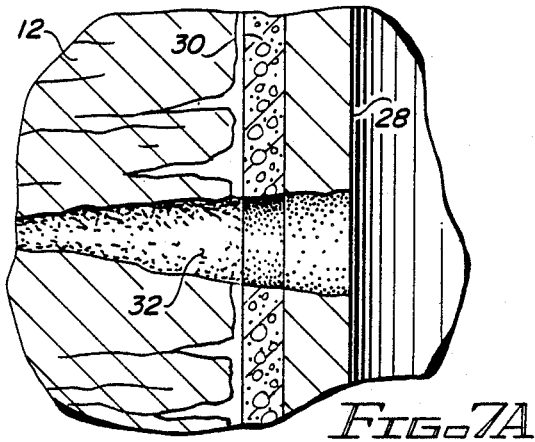
FIG. 7A is an enlarged view of a portion of the well bore and adjoining formation shown in FIG. 7.

Subsequently, after the period of time dictated by the design of the gel-breaker system, the remaining gels 20 and 26 revert to liquid form. As shown in FIGS. 7 and 7A, the casing 28 can then be perforated by conventional means as at 32 and 34 and oil production from the permeable formations 12 and 24 can be carried out. While the perforations 32 and 34 have been shown for purpose of illustration as being made at the same time, it is obvious that the casing 28 may be perforated first at the lower permeable formation 24 and production continued from that formation until such time as the higher permeable formation 12 is required to be produced. The perforations 32 would then be formed and production started from the permeable formation 12. In either case, the liquid compositions remaining after the gels 20 and 26 revert to liquid form are carried out with the fluid initially produced from the associated formation.

It should now be appreciated that the present invention permits permeable formations encountered during the drilling of a well bore to be protected from subsequent treatment operations in a very effective economical manner which can be carried out in a relatively short period of time. The use of the bottom of the drill hole to support the gel introduced to protect the adjacent permeable formation contributes to the economy and effectiveness of the method.

It should be understood that the invention is not necessarily limited to all the specific details described in connection with the preferred method, but that changes to certain features and steps thereof which do not affect the overall basic function and concept of the invention may be made by those skilled in the art without departing from the spirit and scope of the invention, as defined in the appended claims.

What is claimed is:

1. A method of protecting a permeable formation penetrated by a well bore against a subsequent treatment operation, comprising the steps of:
   providing support means in the well bore adjacent the lower boundary of the permeable formation to be protected;
   filling the bore between the support means and the uppermost point of the permeable formation to be protected with liquid composition capable of gelling;
   allowing the liquid composition to gel;
   drilling through the gel so as to open the well bore in the permeable formation, some of the gel remaining to plug the permeable formation in the well bore;
   carrying out the treatment operation; and
   causing the remaining gel to revert to a liquid, whereby the permeable formation is exposed after the treatment operation has been completed.

2. A method according to claim 1, wherein the gel is caused to revert to a liquid by including a gel breaker therein.

3. A method according to claim 2, wherein the gel comprises a carboxylate-containing polymer crosslinked with a chromic carboxylate complex crosslinking agent.

4. A method according to claim 3, wherein the polymer is an acrylamide polymer.

5. A method according to claim 4, wherein the polymer is a polymer selected from the group consisting of polyacrylamide and partially hydrolyzed polyacrylamide, and the crosslinking agent is a chromic acetate complex.

6. A method according to claim 1, including the step of removing the support means after said drilling through the gel.

7. A method according to claim 6, wherein the support means is the temporary bottom of the well bore.

8. A method of drilling a well bore through subsurface formations including a permeable formation, comprising the steps of:
   drilling a well bore through the permeable formation to at least the lower boundary thereof;
   filling the bore in the permeable formation with liquid composition capable of gelling, the liquid composition containing a gel breaker;
   allowing the gel to mature;
   drilling through the gel so as to open the well bore in the permeable formation, some of the gel remaining to plug the permeable formation in the well bore;
   installing a casing in the well bore in the permeable formation; and
   allowing the remaining gel to revert to a liquid.

9. A method according to claim 8, including the step of cementing the casing to the well bore in the permeable formation prior to the remaining gel reverting to a liquid.

10. A method according to claim 9, including the step of perforating the casing in the permeable formation so as to permit production of the permeable zone.

11. A method according to claim 8, wherein the gel comprises a carboxylate-containing polymer crosslinked with a chromic carboxylate complex crosslinking agent.

12. A method according to claim 8 further comprising:
   providing support means in the well bore adjacent the lower boundary of the permeable formation prior to said filling the bore with said liquid composition.

13. A method according to claim 12 further comprising:
   removing said support means after the gel has been drilled through and prior to said installing the casing.

14. A method of drilling a well bore through subsurface formations including upper and lower permeable formations, comprising the steps of:
   drilling a well bore through the upper permeable formation to at least the lower boundary thereof;
   filling the bore in the upper permeable formation with a first liquid composition capable of gelling, the first liquid composition containing a gel breaker;
   allowing the first liquid composition to gel;
   drilling through the gel so as to open the well bore in the upper permeable formation, some of the gel remaining to plug the permeable formation in the well bore;
   drilling a well bore through the lower permeable formation to at least the lower boundary thereof;
   filling the bore in the lower permeable formation with a second liquid composition capable of gelling, the second liquid composition containing a gel breaker;
   allowing the second liquid composition to gel;

drilling through the second gel so as to open the well bore in the lower permeable formation, some of the gel remaining to plug the permeable formation in the well bore;

installing a casing in the well bore in the first and second permeable formations; and allowing the remaining first and second gels to revert to liquids.

15. A method according to claim 14, including the steps of cementing the casing to the well bore in the first and second permeable formations prior to the remaining first and second gels reverting to liquids, and perforating the casing in at least one of the permeable formations so as to permit production of the associated permeable zone.

16. A method according to claim 14 further comprising:

providing a support means in the well bore adjacent the lower boundary of the upper permeable formation prior to filling the well bore in the upper permeable formation with said first liquid composition.

17. A method according to claim 16 further comprising:

removing said support means after the gel has been drilled through and prior to drilling said well bore through the lower permeable formation.

18. A method according to claim 14 further comprising:

providing a support means in the well bore adjacent the lower boundary of the lower permeable formation prior to filling the well bore with said second liquid composition.

19. A method according to claim 18 further comprising:

removing said support means after the gel has been drilled through and prior to installing a said casing in the well bore.

* * * * *